(12) United States Patent    (10) Patent No.: US 7,866,662 B2
Lapointe    (45) Date of Patent: Jan. 11, 2011

(54) SYNCHRONIZED VACUUM BELT FEEDER

(75) Inventor: Andre Lapointe, St-Simon-les-Mines (CA)

(73) Assignee: OSI Machinerie Inc., Quebec (CA)

( * ) Notice: Subject to any disclaimer, the term of this patent is extended or adjusted under 35 U.S.C. 154(b) by 324 days.

(21) Appl. No.: 12/116,870

(22) Filed: May 7, 2008

(65) Prior Publication Data

US 2008/0251994 A1    Oct. 16, 2008

Related U.S. Application Data

(63) Continuation-in-part of application No. 11/271,547, filed on Nov. 9, 2005, now Pat. No. 7,387,298.

(60) Provisional application No. 60/626,872, filed on Nov. 12, 2004.

(51) Int. Cl.
*B65H 29/24* (2006.01)

(52) U.S. Cl. ..................................... 271/194; 271/196
(58) Field of Classification Search ................. 271/194, 271/196, 197; 198/678.1, 689.1, 867.03, 198/803.5
See application file for complete search history.

(56) References Cited

U.S. PATENT DOCUMENTS

| | | | |
|---|---|---|---|
| 1,634,196 A | 6/1927 | Jones | |
| 3,682,469 A | 8/1972 | Itoh et al. | |
| 3,908,835 A | 9/1975 | Lubas | |
| 4,442,657 A | 4/1984 | Busseniers et al. | |
| 6,793,217 B2 | 9/2004 | Gronbjerg | |
| 2003/0164587 A1* | 9/2003 | Gronbjerg | 271/197 |

* cited by examiner

*Primary Examiner*—David H Bollinger
(74) *Attorney, Agent, or Firm*—Wells St. John P.S.

(57) ABSTRACT

A vacuum belt feeder comprising a means of conveyance having a pitch, for retrieving items from a supply zone, and then distributing them at target locations in a discharge zone.

6 Claims, 6 Drawing Sheets

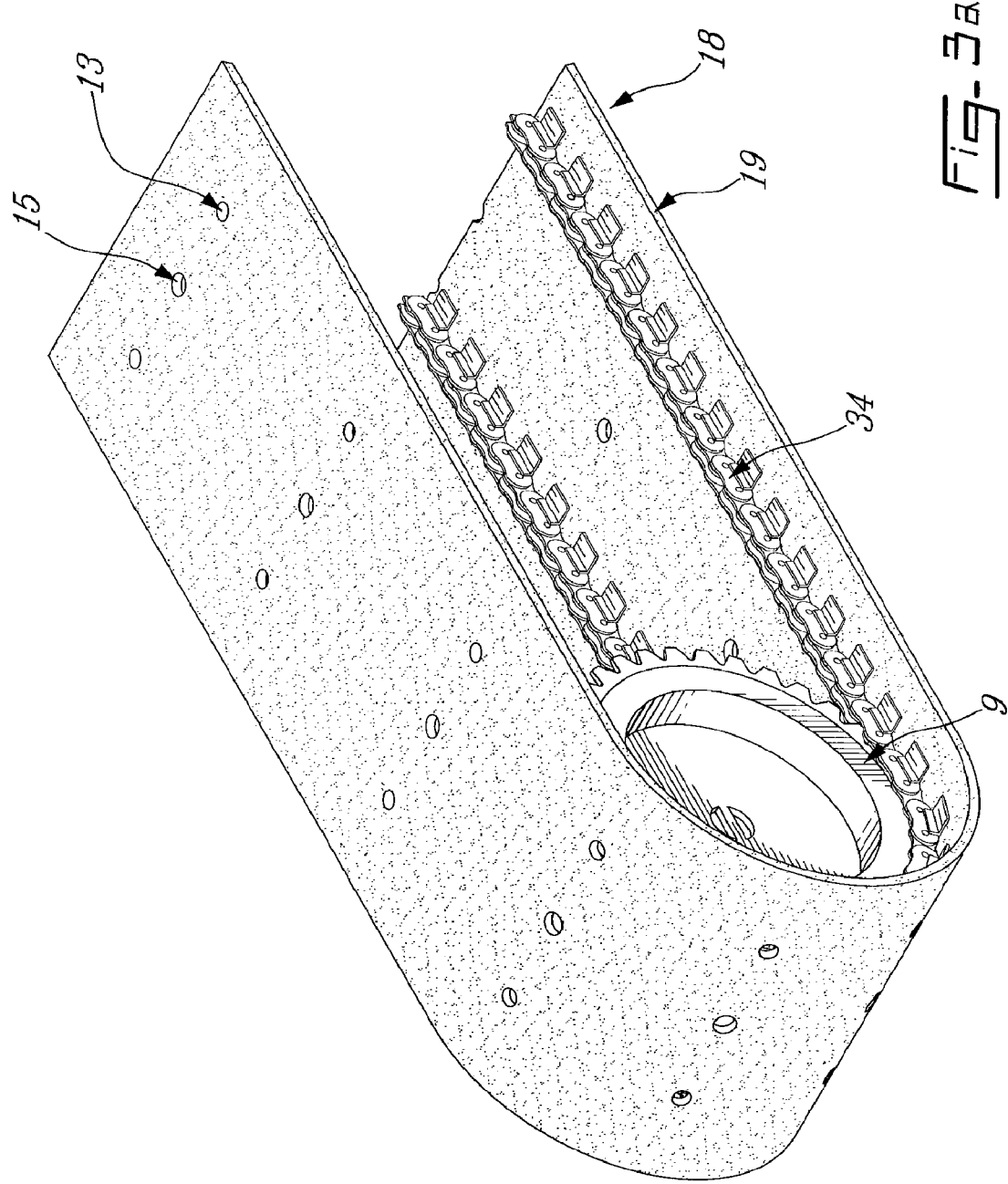

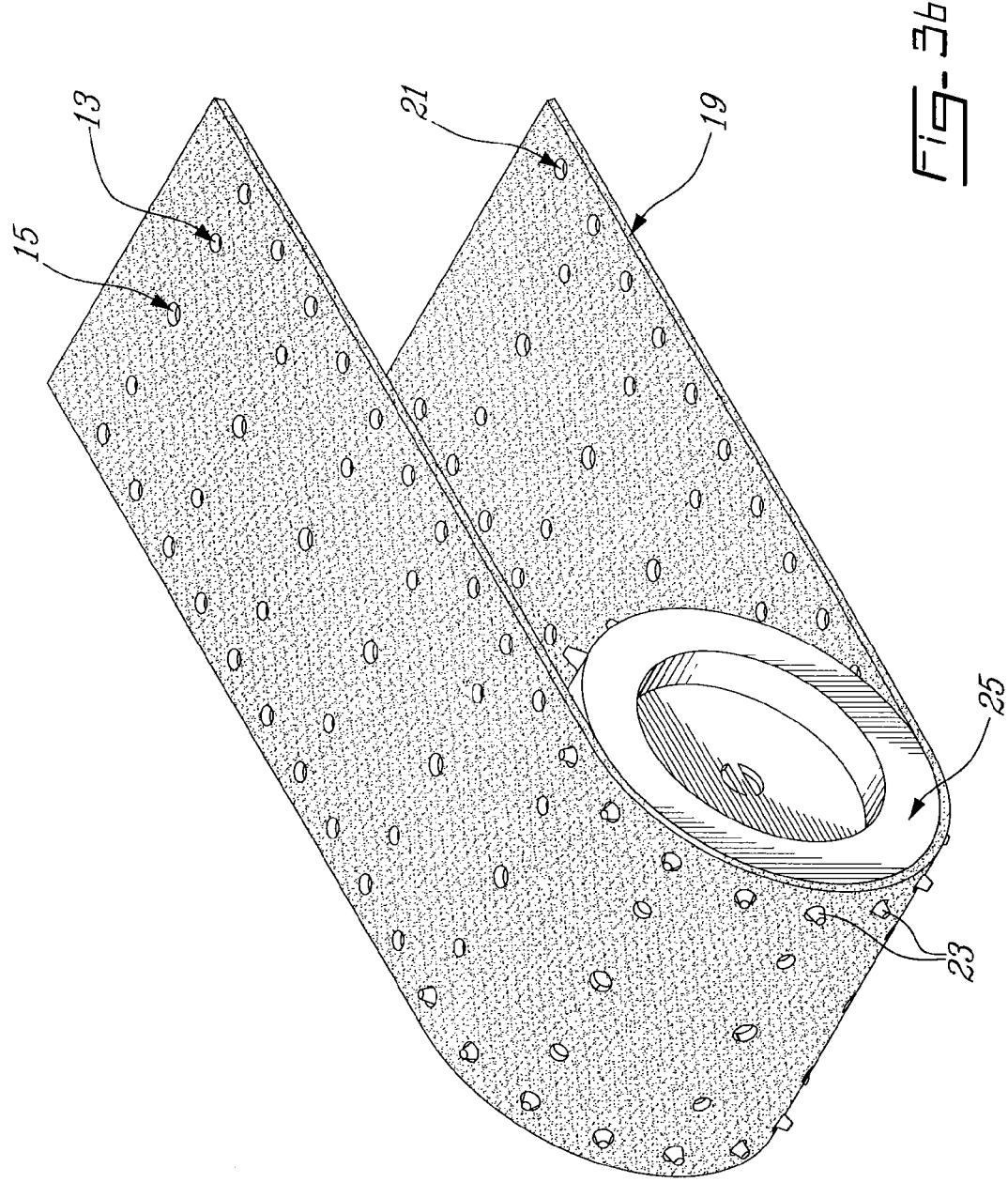

SYNCHRONIZED VACUUM BELT FEEDER

CROSS REFERENCE TO RELATED APPLICATIONS

This application is a continuation in part of U.S. Utility application Ser. No. 11/271,547 filed on Nov. 9, 2005 now U.S. Pat. No. 7,387,298, which claims priority on U.S. provisional application No. 60/626,872, filed on Nov. 12, 2004. This application also claims priority to Canadian Patent Application No. 2,525,435 filed Nov. 7, 2005. All documents above are herein incorporated by reference.

FIELD OF THE INVENTION

The present invention relates to item transfer. More specifically, the present invention is concerned with a synchronized vacuum belt feeder.

BACKGROUND OF THE INVENTION

A number of manufacturing processes need, at some point thereof, transferring items from a supply zone to a discharge zone.

In the food industry, vacuum belt feeders are used from ovens to containers for retrieving baked goods still in baking moulds and conveying them, while at some point along the way dropping the baked goods from the moulds. A means of suction actuated by vacuum is used on the vacuum belt feeders, which allows the moulds to adhere to the conveyor and then dropping them for example.

However, in cases where the transferred items must be sorted out in relation to classification criteria, it is not sufficient that the items be conveyed then dropped. They must also be dropped at target locations, which requires that the vacuum belt feeders be synchronized. For example, in a wood floor manufacturing line, boards processed by a tenoner are conveyed to a wood grader. It may be contemplated using mechanical setups or automated handling to feed the grader. However, such solutions usually involve complex installations, as well as expensive monitoring and maintenance.

There is therefore a need in the art for a synchronized vacuum belt feeder.

SUMMARY OF THE INVENTION

More specifically, there is provided a vacuum belt feeder for transferring items from a supply zone to a discharge zone, comprising a belt provided with suction heads connected to vacuum chambers, the suction heads being continuously actuated under vacuum, except at predetermined locations in the discharge zone where the vacuum is cancelled for release of the items at target locations in the discharge zone, pickup of the items in the supply zone and the release in the discharge zone being synchronized by a pitch of the belt.

There if provided a vacuum belt feeder for transferring items from a supply zone to a discharge zone, comprising a means of conveyance provided with suction heads connected to vacuum chambers, the suction heads being continuously actuated under vacuum, wherein pickup of the items in the supply zone and release of the items at target locations in the discharge zone by the vacuum belt feeder are synchronized by a pitch of the means of conveyance, the means of conveyance comprising a cogged belt, each cog of the cogged belt providing at least one plane surface for accommodation of a seal between each suction head and an associated vacuum chamber, thereby allowing operation of vacuum actuation from outside.

There is provided a vacuum belt feeder for transferring items from a supply zone to a discharge zone, comprising a means of conveyance provided with suction heads connected to vacuum chambers, the suction heads being continuously actuated under vacuum, wherein pickup of the items in the supply zone and release of the items at target locations in the discharge zone by the vacuum belt feeder are synchronized by a pitch of the means of conveyance, the vacuum being controlled by valves or traps actuated by cylinders.

Other objects, advantages and features of the present invention will become more apparent upon reading of the following non-restrictive description of embodiments thereof, given by way of example only with reference to the accompanying drawings.

BRIEF DESCRIPTION OF THE DRAWINGS

In the appended drawings:

FIG. 3(a) is a general view of a conveyance mean according to an alternative embodiment of the present invention and FIG. 3(b) is a general view of a conveyance mean according to another alternative embodiment of the present invention.

DESCRIPTION OF EMBODIMENTS OF THE INVENTION

The present invention will now be described, for illustrative purposes only, in relation to the wood floor manufacturing industry, although it may be used in other fields, as will become more apparent upon reading the following.

Figure 1:
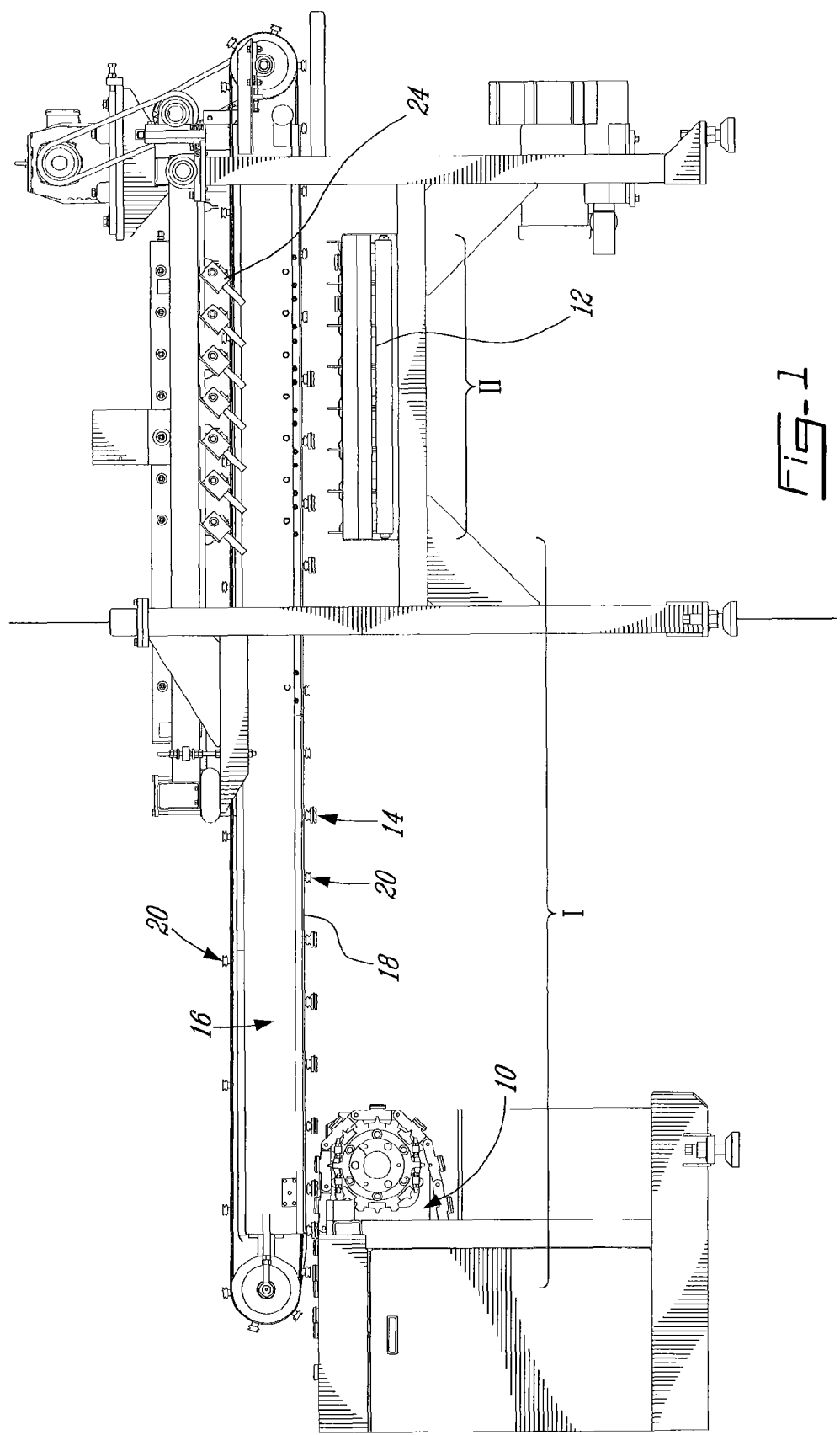
FIG. 1 is a schematic view of a system using a vacuum belt feeder according to an embodiment of the present invention; a FIG. 2(a) is a general view of a conveyance mean

As illustrated in FIG. 1 of the appended drawings, for exemplary purposes only, a wood floor manufacturing system generally comprises a tenoner 10 and conveyor units 16 and 12 to a wood grader (not shown). The tenoner 10 generally machinates boards 14. At the output of the tenoner 10, the conveyor unit 16 conveys the items 14 from the tenoner 10 to the conveyor unit 12 leading to the wood grader.

According to the present invention, the conveyor unit 16 located between the tenoner 10 and the conveyor unit 12 is a vacuum belt feeder. The vacuum belt feeder 16 generally comprises a suction zone (I), wherein the items 14 are retrieved from the tenoner 10, and a discharge zone (II) wherein the items 14 are released and placed on the conveyor unit 12.

Figure 2A:
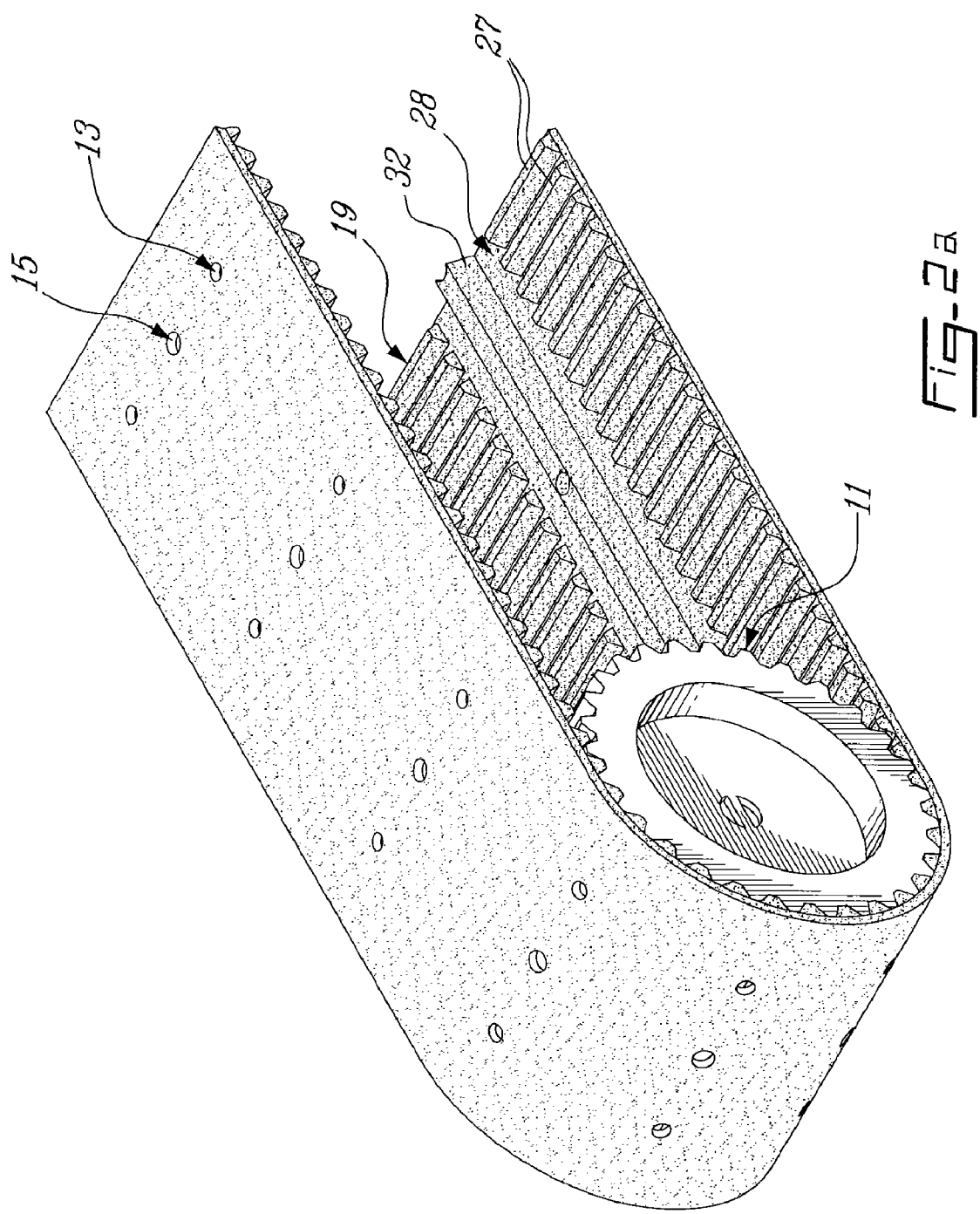
FIG. 2(b) is a closeup cross-section view of a suction head, in the vacuum belt feeder used in the system of FIG. 1.
Figure 2B:
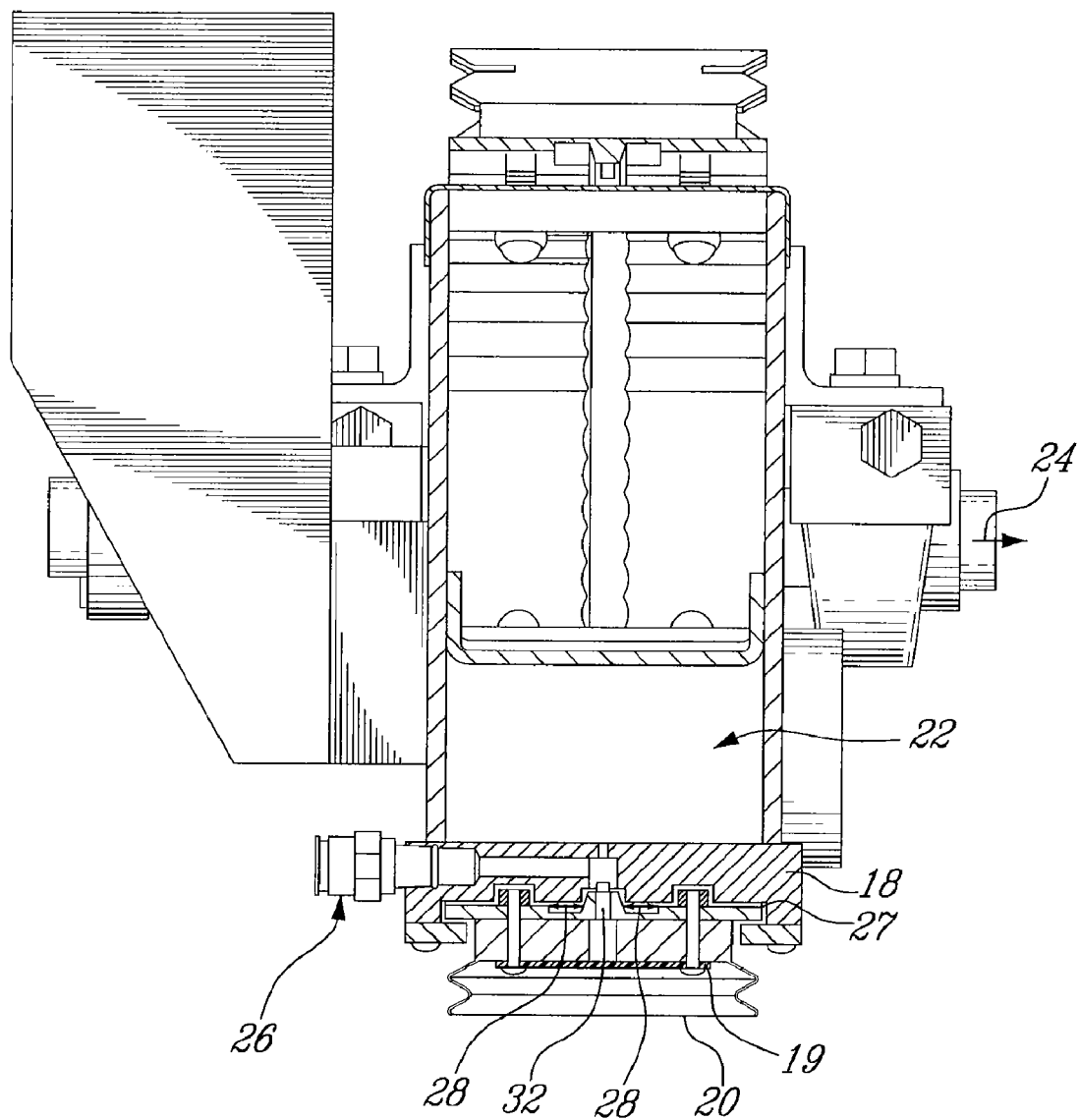
Figure 4:
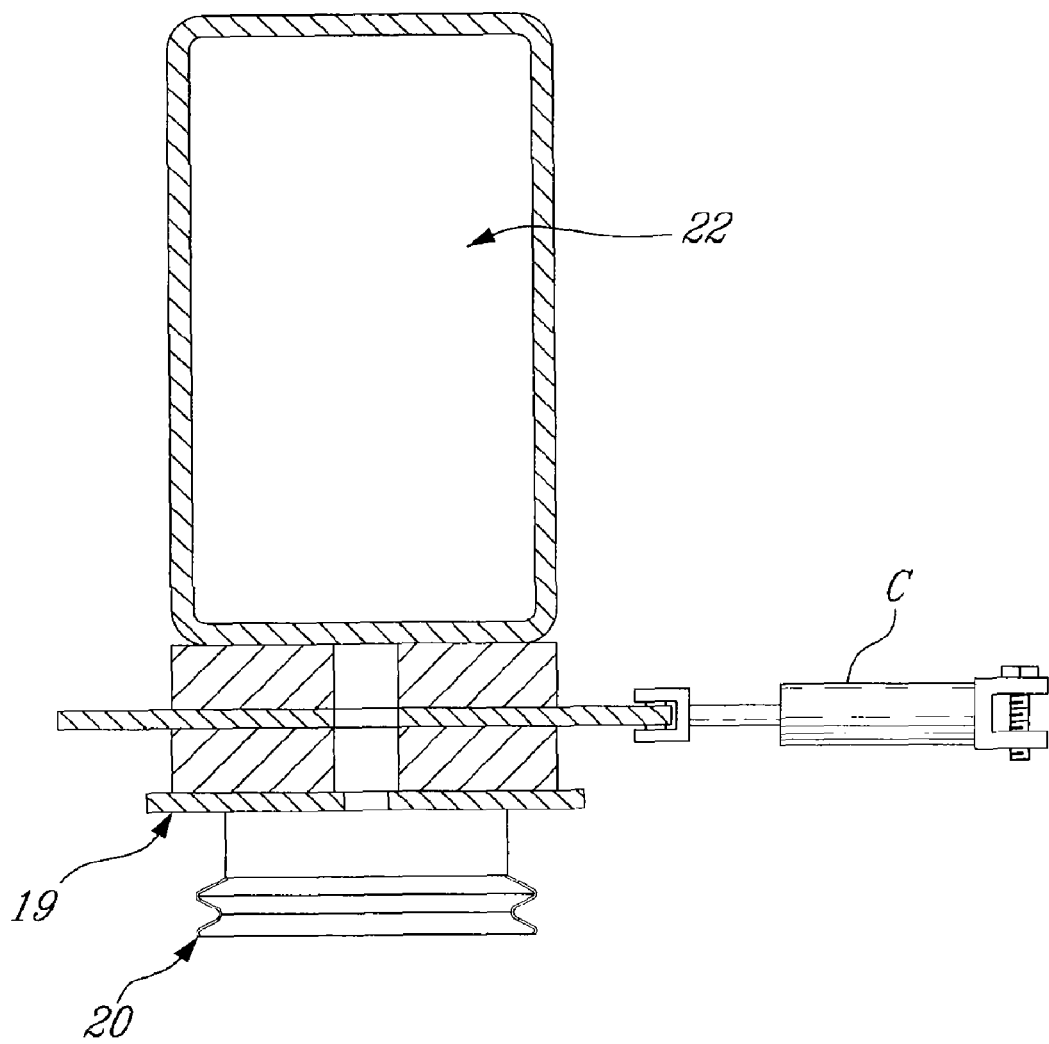
FIG. 4 shows actuation of traps according to an embodiment of the present invention.

The vacuum belt feeder 16 comprises a means of conveyance 18 provided with suction heads 20 connected to vacuum chambers 22 through vacuum holes (see FIG. 2). The suction heads 20 are fastened to the belt of the means of conveyance 18, as illustrated in FIG. 2 for example. They are continuously actuated under vacuum, except at predetermined locations in the discharge zone (II) where valves 24 are actuated so as to let air 26 through the vacuum holes to cancel the vacuum so as to release the items 14 at target locations in the discharge zone (II), on the conveyor unit 12. Traps actuated by a cylinder (C) may be used instead of valves, as illustrated for example in FIG. 4, but valves are found to provide an enhanced vacuum imperviousness.

The belt of the means of conveyance 18 is provided with a pitch, thereby ensuring that the vacuum belt feeder 16 be synchronized in such a way as to allow retrieving the items 14 at the output of the tenoner 10, and release them in the discharge zone (II) to place them on target conveyor parts of the conveyor unit 12.

As best seen in FIG. 2, the belt of the means of conveyance 18 may be a cogged belt 19 trained around a cogged wheel 11, wherein each cog 27 is cut so as to provide at least one plane surface 28, allowing accommodation of a seal between the suction head 20 associated with the vacuum chamber 22 through suction holes 5 and fastened to the belt 19 via fixation holes 13, thereby allowing operation of vacuum actuation from outside. The cogged belt may be equipped with guiding lugs 32.

As an alternative to a cogged belt with sealing surfaces, the means of conveyance 18 may be a flat belt 19, trained around a sprocket wheel 9, with a chain with links 34, as illustrated in FIG. 3a, allowing a mechanical seal between each suction head 20 associated a vacuum chamber though holes 15 and fastened to the belt 19 via fixation holes 13, or a flat belt 19 perforated with holes 21 and engaging spikes 23 of a spike wheel 25 and inherently provided with sealing surfaces as shown for example in FIG. 3b.

All parts of the vacuum belt feeder 16 in the suction zone (I) operate simultaneously at a given speed, the vacuum actuating the suction heads 20 being canceled simultaneously to release a given piece 14 in a target location in the discharge zone (II) on the conveyor unit 12.

A presorting step may be achieved at the output of the tenoner, for example by means of a scanner determining the grade of each delivered board to determine on which conveyor part of the conveyor unit 12 a given wood piece is to be dropped. Alternatively, an operator may visually pre-sort the items delivered by the tenoner 10 and direct them. In absence of such a pre-sorting step, all items of wood are delivered to the conveyor unit 12, the items being distributed among the different conveyor parts of the conveyor unit 12 to allow operators attending each conveyor part of the conveyor unit 12 to work at a same pace. In any case, synchronization is required since the boards need to be dropped among the different conveyor parts of the conveyor unit 12.

In a wood floor manufacturing line, the vacuum belt feeder as described hereinabove allows processing up to 300 boards per minute, in a continuous manner, without resorting to mechanical movements, resulting in a system that is cost effective as well as easy to monitor and maintain.

The present invention provides precision and speed of operation at controlled costs, compactness, and ease of maintenance. It also provides the control to handle the boards from the tenoner to the discharge zone (II), as illustrated herein.

Although the present invention has been described hereinabove by way of embodiments thereof, it may be modified, without departing from the nature and teachings of the subject invention as defined in the appended claims.

What is claimed is:

1. A synchronized vacuum belt feeder for transferring items from a supply zone to a discharge zone, comprising a belt, said belt having a pitch, said belt being provided with suction heads, each suction head being connected to an associated vacuum chamber, each suction head being continuously actuated under vacuum to support a corresponding item, except at predetermined locations in the discharge zone where the vacuum actuating the suction heads is cancelled for release of the items at target locations in the discharge zone, pickup of the items in the supply zone and said release in the discharge zone being synchronized by said pitch of said belt.

2. The synchronized vacuum belt feeder of claim 1, wherein said belt comprises a flat belt trained around sprocket wheels, and a chain with links fastened to an inner surface of said flat belt on each side of the flat belt for engaging said sprocket wheels and creating said pitch, said chains providing a mechanical seal between each suction head and an associated vacuum chamber.

3. The synchronized vacuum belt feeder of claim 1, wherein said belt comprises a flat belt, said pitch being created by perforated holes in said flat belt engaging spikes of a spike wheel.

4. A vacuum belt feeder for transferring items from a supply zone to a discharge zone, comprising a belt provided with suction heads connected to vacuum chambers said suction heads being continuously actuated under vacuum except at predetermined locations in the discharge zone where the vacuum is cancelled for release of the items at target locations in the discharge zone, pickup of the items in the supply zone and said release in the discharge zone being synchronized by a pitch of said belt, wherein the vacuum is controlled by one or both of traps actuated by cylinders and valves.

5. The synchronized vacuum belt feeder of any one of claims 1 to 3, all parts thereof being synchronized, the vacuum actuating the suction heads being cancelled simultaneously to release the items in the target locations in the discharge zone.

6. A vacuum belt feeder for transferring items from a supply zone to a discharge zone, comprising a means of conveyance provided with suction heads connected to vacuum chambers, said suction heads being continuously actuated under vacuum, wherein pickup of the items in the supply zone and release of the items at target locations in the discharge zone by said vacuum belt feeder are synchronized by a pitch of said means of conveyance, the vacuum being controlled by ones of: valves and: traps actuated by cylinders.

* * * * *